United States Patent
Hubbard et al.

(10) Patent No.: US 8,964,952 B2
(45) Date of Patent: Feb. 24, 2015

(54) SYSTEM AND METHOD FOR SELF-CONFIGURING SIP-CAPABLE DEVICE

(75) Inventors: Christopher Todd Hubbard, Westfield, IN (US); James L. Hendry, Jr., Flower Branch, GA (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 1463 days.

(21) Appl. No.: 11/469,632

(22) Filed: Sep. 1, 2006

(65) Prior Publication Data

US 2008/0130844 A1    Jun. 5, 2008

(51) Int. Cl.
*H04M 11/00* (2006.01)
*H04L 29/08* (2006.01)
*H04L 29/06* (2006.01)

(52) U.S. Cl.
CPC ........ *H04L 67/303* (2013.01); *H04L 29/06027* (2013.01); *H04L 65/1006* (2013.01); *H04L 67/34* (2013.01)
USPC ...................................................... 379/93.02

(58) Field of Classification Search
CPC ..................... H04L 29/06027; H04L 65/1006; H04L 67/303
See application file for complete search history.

(56) References Cited

U.S. PATENT DOCUMENTS

| | | |
|---|---|---|
| 5,960,073 A | 9/1999 | Kikinis et al. |
| 5,991,390 A | 11/1999 | Booton |
| 6,012,088 A | 1/2000 | Li et al. |
| 6,256,319 B1 | 7/2001 | Apgar et al. |
| 6,498,791 B2 | 12/2002 | Pickett et al. |
| 6,577,726 B1 | 6/2003 | Huang et al. |
| 6,694,367 B1 | 2/2004 | Miesbauer et al. |
| 6,904,485 B1 | 6/2005 | Quinton |
| 6,973,175 B2 | 12/2005 | Huang et al. |
| 7,039,688 B2 | 5/2006 | Matsuda et al. |
| 7,881,289 B1 * | 2/2011 | Croak et al. .................. 370/356 |
| 2002/0085705 A1 | 7/2002 | Shires |
| 2003/0002479 A1 | 1/2003 | Vortman et al. |
| 2004/0250072 A1 * | 12/2004 | Ylonen ......................... 713/170 |
| 2005/0074031 A1 | 4/2005 | Sunstrum |
| 2005/0190747 A1 * | 9/2005 | Sindhwani et al. ........... 370/352 |
| 2005/0220083 A1 | 10/2005 | Takeuchi |
| 2007/0133567 A1 | 6/2007 | West et al. |

* cited by examiner

*Primary Examiner* — Luat Phung

(57) ABSTRACT

A computer-implemented system and method for the deployment of automatically configuring network communication endpoints is disclosed. At least one logical profile is stored in a plurality of configuration files resident on a network. The logical profile includes configuration information as well as an extension from a communication distribution system which a device should serve. Upon connection to the network and input of configuration information corresponding to a pre-existing logical profile, the device automatically configures itself for use, reboots, and is operational in the desired form.

43 Claims, 4 Drawing Sheets

SYSTEM AND METHOD FOR SELF-CONFIGURING SIP-CAPABLE DEVICE

FIELD OF THE INVENTION

The present invention generally relates to telecommunication systems and methods, as well as systems for communication systems deployment. More particularly, the present invention pertains to a system and method for deployment of automatically configuring network communication endpoints.

BACKGROUND

As businesses continue to grow, so too does the complexity of providing traditional back end support services. Current telecommunications technology has expanded beyond the traditional packet-switched telephone network (PSTN). With this, many businesses and individuals are adopting Internet Protocol (IP) telecommunications. For telecommunications providers who have adopted an IP infrastructure it is often difficult to manage an efficient and error-free deployment of network communication endpoints, such as individual user telephones. Traditionally, a manager in charge of the infrastructure would have to logically create a profile in the network's configuration files for each device. The manager would then populate that profile with information such as the extension the device should serve as from a private branch exchange (PBX), the permissions granted to the device, or the servers the device should communicate with. Fortunately, this information could be readily duplicated or dynamically generated for most devices. However, each logical profile within the configuration file(s) also required a unique MAC address to link the profile to a device. The MAC address entered in the configuration file(s) had to correspond with the MAC address associated with the device to be deployed in order for the device to function as desired upon connection to the network. In the event one new device is sporadically added to the network this limitation commonly does not present a problem, however, when rapid deployments of a large number of devices is required, the process can quickly become a logistical nightmare.

The foregoing problems are demonstrably present in the telecommunications industry. For example, a telecommunications provider may be required to install hundreds, if not thousands, of new devices upon the installation of a system. Additionally, the manager would be required to ensure the delivery of the proper device to its proper destination in order for the destination to receive the profile designated for it, including its proper extension and permissions. This process is tedious and difficult to manage, and thereby prone to error. Therefore, improvements are needed in the area of telecommunication device deployment.

SUMMARY

Various technologies and techniques are disclosed for configuring a network telecommunication device for use with an SIP based switch. A logical profile is created in a network telecommunication infrastructure. The device is then connected to the network and loaded into a provisioning mode. The user then enters a user name and security code. In response, the device automatically communicates with the logical profile created on the network that corresponds to the received username and registers its MAC address with the profile.

In one embodiment, the device is a SIP enabled telephone and the user name is the extension associated with the logical profile. Additionally, the logical profile is stored in the configuration files resident on the network and includes the SIP server assigned to the device as well as a plurality of permissions such as dialing rights, speed dial, and voicemail access.

In another embodiment, the device is a network communication endpoint which is capable of receiving configuration information from a user and automatically registering with an SIP capable switch on the network such that communications are received on the device which are destined for an extension derived from the configuration information.

Yet other forms, embodiments, objects, advantages, benefits, features, and aspects of the present invention will become apparent from the detailed description and drawings contained herein.

This summary is provided to introduce a selection of concepts in a simplified form that are described in further detail in the detailed description and drawings contained herein. This Summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION

Figure 1:
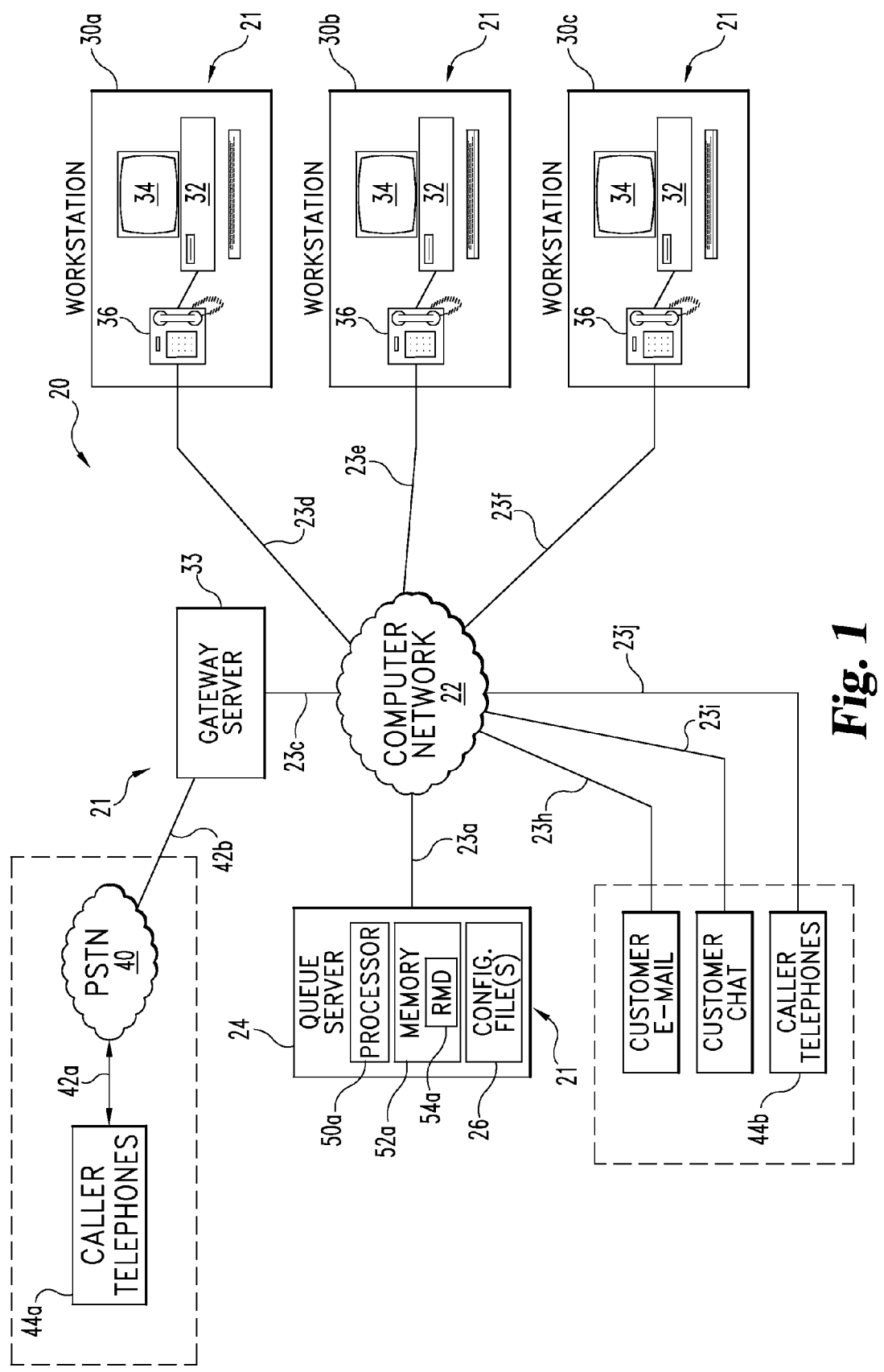
FIG. 1 is a diagrammatic view of a computer system of one implementation.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

By utilizing the concepts of the present system and methods, a telecommunication manager can quickly configure and deploy any number of telecommunication devices without regard to their specific MAC addresses and without undertaking the tedious task of ensuring that each device is installed in a specific destination.

One implementation includes a unique system and methods for deploying self-configuring network communication devices, such as in a contact center, using a automatic call distribution system, such as a queue server. It shall be understood that the principles of the present invention may also be applied to similar systems implemented using Private Branch Exchanges, Interactive Voice Response systems, or other network communication distribution systems, such as, by way of non-limiting example, a corporate telecommunication system.

FIG. 1 is a diagrammatic view of computer system 20 of one embodiment of the present invention. Computer system 20 includes computer network 22. Computer network 22 couples together a number of computers 21 over network pathways 23. More specifically, system 20 includes several servers, namely Queue Server 24 and Gateway Server 33. System 20 also includes workstations 30a, 30b, and 30c (collectively workstations 30). While computers 21 are each illustrated as being a server or client, it should be understood that any of computers 21 may be arranged to include both a client and server. Furthermore, it should be understood that while five computers 21 are illustrated, more or fewer may be utilized in alternative embodiments.

Each computer 21 includes one or more processors or CPUs (such as 50a) and one or more types of memory (such as 52a). Each memory 52 includes a removable memory device (such as 54a). Although not shown to preserve clarity, each computer 21 of system 20 includes one or more processors or CPUs and one or more types of memory. Each processor may be comprised of one or more components configured as a single unit. Alternatively, when of a multi-component form, processor 50 may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

System 20 further illustrates Public Switched Telephone Network (PSTN) 40 coupled to Gateway Server 33, by pathway 42b. Caller telephones 44 may be coupled to PSTN 40 by pathway 42a or to network 22 directly by network path 23j. It should be understood that callers using analog telephones 44a will normally connect to the PSTN 40 by dialing a standard directory phone number, such as an "800" number. The PSTN then sends a connection request to the Gateway Server 33, which translates the request to a digital format for retransmission to Queue Server 24 via network 22. The Queue Server 24 then establishes an audio connection with the PSTN, using Gateway Server 33 as the digital/analog conversion point.

However, callers using digital telephones 44b have the additional option of bypassing both the PSTN 40 and the Gateway Server 33 and directly dialing the digital address of the network 22 or the Queue Server 24. In this scenario, the digital telephone sends a connection request, such as a SIP invitation, to the Queue Server 24 via network 22. The Queue Server 24 then establishes a digital audio connection with the digital telephone 44b via network 22.

Digital telephones 36 are each associated with a different one of workstations 30 respectively. Additionally, it shall be appreciated that each digital telephone 36 has a unique network address, such as a MAC address. In the illustrative embodiment, digital telephones 36 are SIP enabled telephones. Digital phones 36 may be connected to computer network 22 through a network interface. In a further form, the connection to network 22 may be made first to the digital phone, then from the digital phone 36 to the workstation computer 32 by way of a pass-through connection on the digital phone or vice versa. Alternatively, two connections from the network can be made, one to the digital phone 36 and one to the workstation computer 32. Additionally, in yet another form, digital telephones 36a, 36b, and 36c may be integrated into the agent computer 32 and/or implemented in software.

Workstations 30a, 30b, and 30c (collectively workstations 30) each include a workstation computer 32 coupled to a display 34. Workstation computers 32 may be of the same type, or a heterogeneous combination of different computing devices. Likewise, displays 34 may be of the same type, or a heterogeneous combination of different visual devices. It should be understood that digital telephones 36, which are capable of being directly connected to network 22 and self-configuring for use, may be in the form of a handset, headset, or other telephone arrangement as would occur to those skilled in the art.

Although not shown to preserve clarity, each agent workstation 30 may also include one or more operator input devices such as a keyboard, mouse, track ball, light pen, and/or microtelecommunicator, to name just a few representative examples. Also, besides display 34, one or more other output devices may be included such as loudspeaker(s) and/or a printer.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22. It should also be recognized that computer network 22 may include one or more elements of PSTN 40.

In one embodiment, system 20 operates as a contact center at one or more physical locations that are remote from one another with Queue Server 24 being configured as a contact center server host, and workstations 30 each arranged as a contact center agent station. Additionally, any of the computers 21 may be incorporated into other devices or located in geographically different locations from one another.

Additional digital telephones 36 may be connected to the network 22 to provide additional workstations 30 (not shown). Contact center applications of system 20 typically include many more workstations of this type at one or more physical locations, but only a few have been illustrated in FIG. 1 to preserve clarity. Also, one or more Queue Servers 24 may be configured as a contact center server host at one or more physical locations.

Alternatively or additionally, system 20 may be arranged to provide for distribution and routing of a number of different forms of communication, such as telephone calls, voice mails, faxes, e-mail, web chats, instant messages, web call backs, and the like. In addition, business/customer data associated with various communications may be selectively accessed by system 20. This data may be presented to an agent at each agent workstation 30 by way of monitor 34 operatively coupled to the corresponding agent computer 32.

Incoming communication data may arrive in either an analog or digital format. In the case of analog communications arriving from the PSTN 40, both the signaling and data must be translated to a digital format by a conversion device, such as Gateway Server 33, before being propagated over network 22 to a server or workstation 30. Likewise, outgoing communication data will exist in a digital format while propagating over network 22 but will need to be converted to an analog PSTN format before being passed to PSTN 40.

If communication data is being sent to a digital device that is connected directly to network 22, no digital/analog conversion is required. As a non-limiting example, an outside party using a digital communication device may establish a direct digital communication stream with workstation after being assigned to that user by Queue Server 24. In one form, the signaling and data communicated between endpoints on network 22 will remain in a digital format. References to digital audio communications in the illustrative embodiment shall be understood to include all forms of digital telephony such as VOIP, SIP, and SRTP to name just a few. The present system and method may be applied to many other types of communications and their use within the current system and method is desired to be protected.

Figure 2:
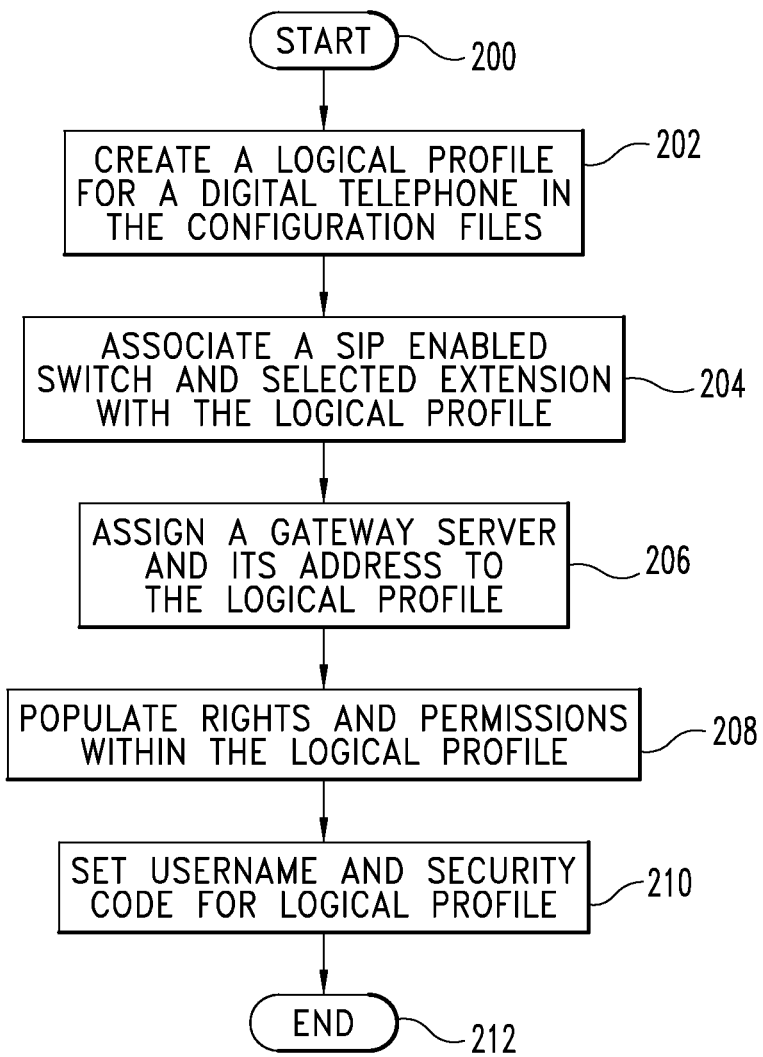
FIG. 2 is a process flow diagram demonstrating one example of the steps involved in creating a logical profile for a network communication device in one embodiment of the present system and method.

Turning to FIG. 2, with continued reference to FIG. 1, the stages for creating a logical profile for a network communication device in one embodiment of the present system and method are shown. In the illustrative embodiment, the process of FIG. 2 is at least partially implemented in the operating logic of system 20. In a further form, a portion of the process is implemented using a wizard or automated program which facilitates batch creation of large quantities of logical profiles. In an alternate embodiment, a portion of the process involves the manual entry of profiles within the configuration file(s) stored on the network.

The process begins at start point 200 with a manager of computer system 20 creating a logical profile for a digital telephone (step 202). In the illustrative embodiment, each logical profile is created in the configuration file(s). These configuration file(s) are necessary in order to ensure the proper function of digital communication devices, such as SIP enabled telephones, which are stored on Queue Server 24 in the illustrative embodiment. It shall be appreciated that configuration file 26 may be stored anywhere on the network 22 accessible to digital telephones 36. Additionally, network configuration file(s) 26 may be implemented as a plurality of one or more configuration files. In one form, one configuration file may include a list of the SIP devices while a second file may include their assigned extensions. In an alternate form, a separate configuration file or plurality of configuration files may store the requisite information for each device. For example, a separate configuration file may store voicemail information, while another file may store assigned ring tone information.

Figure 3:
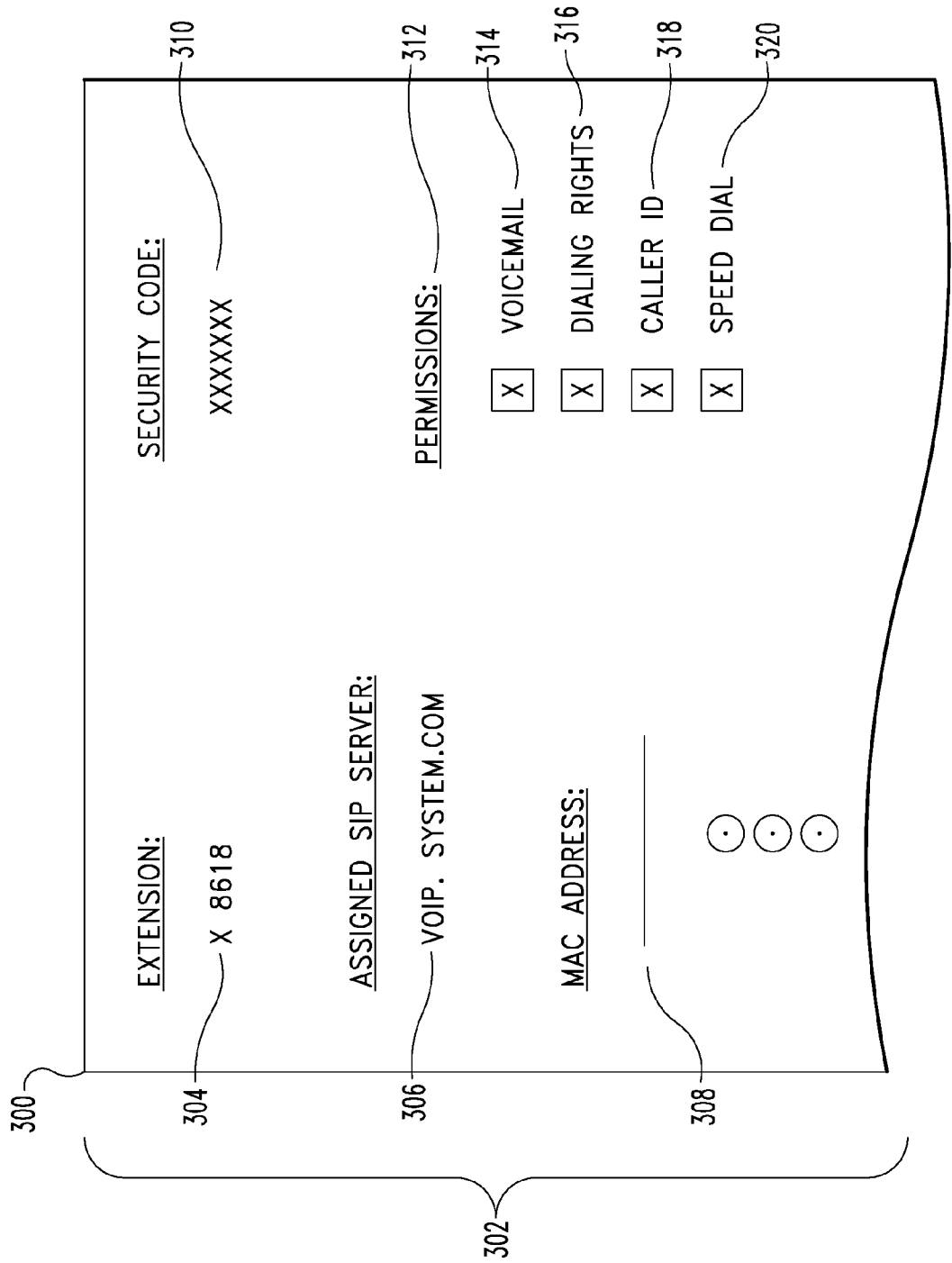
FIG. 3 is a logical diagram illustrating one example of the contents of a logical profile suitable for use in one embodiment of the present system and method.

Turning to FIG. 3, with continued reference to FIGS. 1-2, a representative example of a configuration file having multiple entries is illustrated in logical form. It shall be appreciated that the contents of the configuration file illustrate in FIG. 3 may be located in several separate configuration files depending upon the implementation. Configuration file 300 includes a first logical profile 302 which corresponds to an individual device; however, the identity of the device need not be determined at the time of creation. For example, logical profile 302 may be associated with any digital telephone to be deployed to workstation 30a of FIG. 1. Upon creation in step 202 a plurality of fields are created which may be individually populated by the manager as described below, or may be automatically populated with default entries and/or entries dynamically created by programmed logic of computer system 20.

Once the logical profile 302 has been created within configuration file 300 (stage 202), the manager proceeds to assign a selected extension 304 from Queue Server 24 (stage 204). Additionally, the manager assigns a server, such as SIP server 306, to the logical profile 302 (stage 206). The server designated allows the digital phone 36 to determine its proper communication pathway upon startup. In the illustrated embodiment, the assigned server could be gateway server 33.

During the creation of the profile, MAC address field 308 is blank, as it will be filled in during device registration. Next, the manager populated the rights and permissions 312 associated with logical profile 302 (stage 208). By way of non-limiting example, permission rights may include voicemail access, external dialing, rights caller ID, and speed dial to name just a few representative examples. Finally, the manager also sets a security code 310 for the logical profile 302. In the illustrated embodiment, this security code is numeric, to facilitate proper entry into digital phone 36. It shall be appreciated that the steps of FIG. 3 described above could occur simultaneously or in a differing order without departing for the sprit of the invention.

Figure 4:
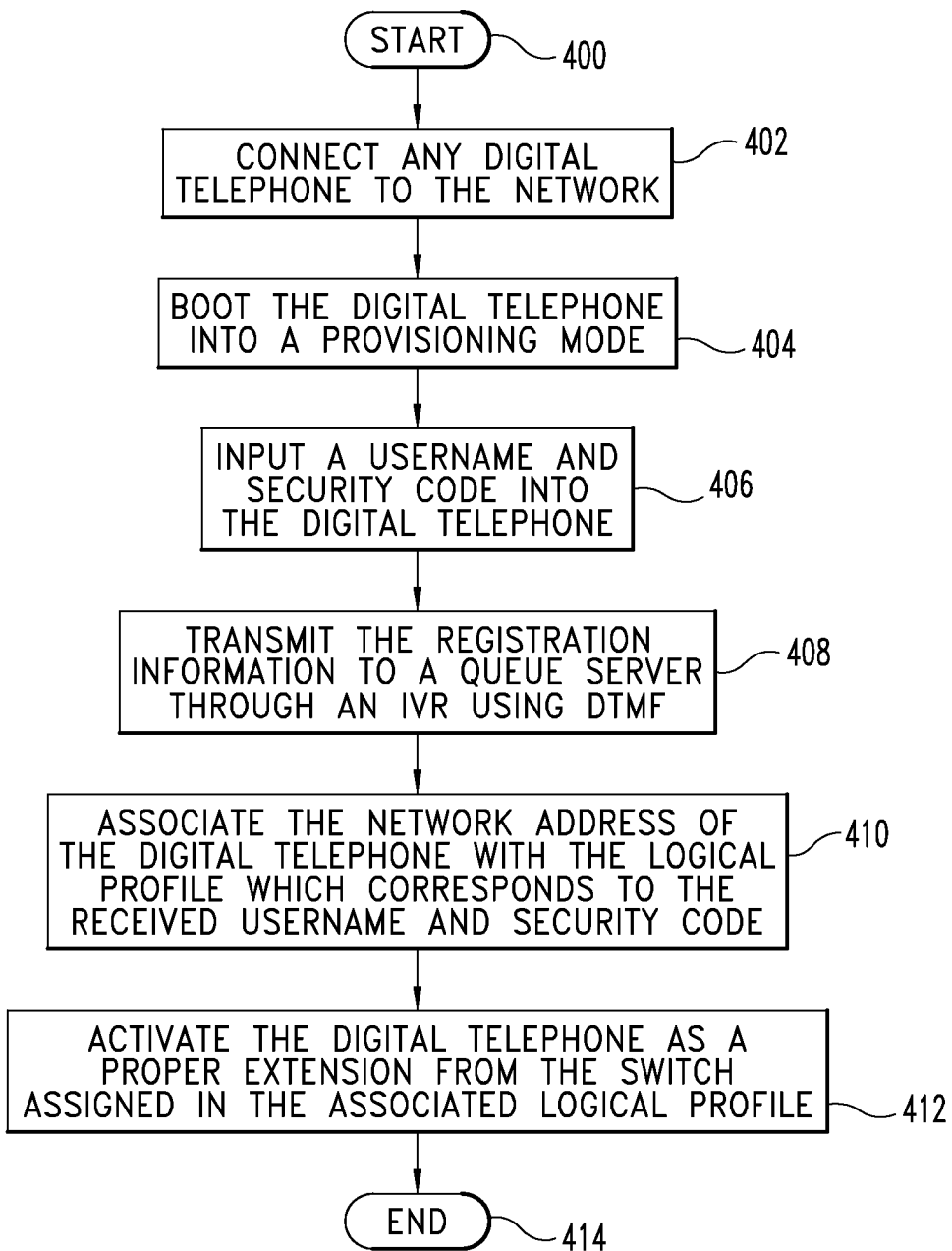
FIG. 4 is a process flow diagram demonstrating one example of the stages involved in associating a network communication device with an existing logical profile.

Turning to FIG. 4, with continued reference to FIGS. 1-3, the stages for connecting and configuring a network communication device in one embodiment of the present system and method are shown. In the illustrative embodiment, the process of FIG. 4 is completed by a user of computer system 20 using any device compatible with the logical profile created for it. It shall be appreciated that a manager may also complete the process, but no knowledge of the configuration file(s) or logical profiles is required to complete the process of FIG. 4.

The process beings at start point 400 with the user connecting a network communication endpoint, such as digital telephone 36a, to network 22 (stage 402). In the illustrative embodiment, the digital telephone is connected to an available network port of network 22, such as an RJ-45 connection, using a suitable connector, such as twisted pair Ethernet cable. It shall be appreciated that other connection methods may be used such as wireless, Firewire (IEEE 1394), Universal Serial Bus (USB), serial, optical, or any other connection known to one of skill in the art or arising in the future. Once connected and powered on, the digital phone 36 is booted into a provisioning mode (stage 404). While in this provisioning mode, the user may navigate the menus of the digital phone 36a in order to configure the phone, such as in the case of a web-enabled telephone, but may not make or receive external communications until configuration is complete. In one form, once in the provisioning mode, the user initiates a communication with an IVR of queue server 24 and provides registration information, including a username and security code combination, which corresponds with a pre-existing logical profile (stage 406) using a method such as DTMF signals. In a further form, other entry methods such as voice recognition may be implemented. In an alternate form, the user may provide this registration information using the web browser functionality of the telephone. In the illustrative embodiment, the username is the extension assigned to the digital phone 36, which may be assigned to a specific user or to a specific location in which the phone resides. Additionally, in a further form, the security code is a numeric combination, preferably of at least six numbers in length.

Once the user has entered a username and security code combination, the digital telephone 36 automatically transmits a message, which includes its associated MAC address, to the Queue Server 24 (stage 408). Upon receipt of the message, Queue Server 24 retrieves the logical profile associated with the username entered and confirms the entry of the security code. Upon verification, the Queue Server 24 enters the transmitted MAC address into the designated logical profile in the configuration files 26 (stage 410), thereby completing the profile for use. It shall be understood that the configuration actions taken by Queue Server 24 may be completed by other components of network 22 depending upon the implementation and/or the storage location of the configuration file(s).

Upon confirmation of the entry of the transmitted MAC address into field 308 of the logical profile, the digital phone 36 reboots and during its startup process communicates with the configuration files to find its logical profile assigned by MAC address in a way known to those of skill in the art. The digital phone 36 uses the information stored in its logical profile in the configuration files 26 to enable itself to send and receive communications from the switch (stage 412) just as if the manager has performed the tradition method of creating a logical profile complete with a MAC address of the targeted device and specifically delivered that device to its destination. The process ends at endpoint 414, and the device is configured for use going forward.

It shall be appreciated that existing digital phones 36 may be no longer needed and thus de-registered from the network. In order to do so, a manager may either select a menu option of the digital phone 36 and enter the appropriate username and security code combination to transmit a de-registration message to Queue Server 24 which may either delete the MAC address associated with the logical profile or delete the logical profile altogether. It shall be understood that the registration message may be communicated to any other server or device having the ability to modify the configuration files 26. Additionally, in order to effectuate the same change, a manager with sufficient permissions may simply access the configuration files 26 using computer system 20 and remove the MAC address of the digital phone 36 to be removed from its associated logical profile.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A method of activating a digital telephone, comprising the steps of:
    establishing a logical configuration at a configuration server, wherein said logical configuration includes an information and does not include an other information;
    associating the logical configuration with a digital telephone, the digital telephone comprising an input means and a display;
    connecting said telephone to a digital network, said network being connected to a SIP enabled switch and the configuration server;
    booting said telephone into a provisioning mode, the provisioning mode presenting one or more configuration menus through the display;
    receiving, from the input means, a configuration code at the telephone, said configuration code comprising at least one of a username and a security code;
    transmitting a communication related to said configuration code from the digital telephone to the configuration server;
    transmitting a communication related to said other information, wherein said transmitting said communication related to said other information is in response to said transmitting said communication related to said configuration code;
    identifying said logical configuration by employing said communication related to said configuration code, wherein said configuration code corresponds to said information in said logical configuration;
    adding, after said identifying said logical configuration, said other information to said logical configuration in creating an amended logical configuration; and,
    assigning a telephone extension and at least one permission to said telephone with respect to said switch in accordance with said amended logical configuration.

2. The method of claim 1, wherein said other information is necessary for said telephone to operate with respect to said switch.

3. The method of claim 2, wherein said other information is necessary for said telephone to operate with respect to said switch in accordance with said amended logical configuration.

4. The method of claim 3, wherein said other information is a MAC address.

5. The method of claim 4, wherein said MAC address is associated with said telephone, and wherein said additional information is employed to uniquely identify said logical configuration.

6. The method of claim 5, wherein said amended logical configuration is a complete logical configuration, and wherein said complete logical configuration includes a username associated with said telephone.

7. The method of claim 6, wherein said enabling includes said creating said amended logical configuration.

8. The method of claim 7 wherein said transmitting of said communication related to said other information is from said telephone.

9. The method of claim 1, wherein said enabling includes a creating a complete logical configuration.

10. The method of claim 9, wherein said other information is a MAC address.

11. The method of claim 10 wherein the transmitting of said communication related to said other information is from said telephone, and wherein said assigning is essentially performed completely by said telephone.

12. The method of claim 1, wherein said assigning includes said creating of said amended logical configuration.

13. A method of activating a digital telephone on a network, comprising:
    (i) transmitting, from the telephone and via the network, a MAC address associated with the telephone;
    (ii) receiving the transmitted MAC address;
    (iii) entering the received MAC address into a profile, the profile being associated with said telephone and comprising an information, a telephone extension and at least one permission;

(iv) employing, after the entering of the received MAC address into the profile, the entered MAC address in identifying the profile;

(v) accessing an information associated with the identified profile;

(vi) enabling, as an at least indirect result of the accessing of step (v), the telephone to receive a communication via the network according to the accessed information;

(vii) assigning said telephone extension and said at least one permission to said telephone with respect to said switch in accordance with said profile.

14. The method of claim 13 wherein the MAC address was not in the profile prior to step (iii).

15. The method of claim 14 wherein the enabling of step (vi) includes enabling the telephone to send an other communication via the network according to the accessed information.

16. The method of claim 15 wherein the entering of the received MAC address in step (iii) corresponds to a completing of the profile;
wherein the identifying is at least partially performed by the telephone;
wherein the device, at a time associated with the transmitting, is not able to identify the profile in any way; and,
wherein the profile is uniquely associated with the telephone.

17. The method of claim 16 wherein the telephone, at the time associated with the transmitting, is not able to receive any external communication via the network.

18. The method of claim 17 further including, prior to step (iii):
(A) transmitting an other information from the telephone; and
(B) examining whether or not the transmitted other information appropriately corresponds to an additional information associated with the profile; and wherein step (iii) is only performed after step (B) determines that there is an appropriate correspondence between the transmitted other information and the additional information in the profile.

19. The method of claim 18 wherein the accessed information includes at least a portion of the additional information.

20. The method of claim 19 wherein the portion of the additional information includes a username associated with the device.

21. The method of claim 20 wherein the username is an extension associated with the device.

22. The method of claim 21 wherein the additional information also includes a security code.

23. The method of claim 17 wherein at some point in the course of steps (i) to (vi), there is a provisional mode and an other mode, wherein the provisional mode precedes the other mode.

24. The method of claim 23 further including:
loading the telephone prior to step (iv);
reloading the telephone after step (iii);
wherein at least two steps of steps (i) to (vi) are unable to occur until the loading and the reloading of the telephone are performed; and
wherein at least one step of steps (i) to (vi) is not performable without the reloading of the telephone.

25. The method of claim 14 further including, prior to step (iii):
(A) transmitting an other information from the telephone; and, (B) examining whether or not the transmitted other information appropriately corresponds to an additional information in the profile; and
wherein step (iii) is only performed after step (B) determines that there is an appropriate correspondence between the transmitted other information and the additional information in the profile.

26. The method of claim 25 wherein the accessed information includes at least a portion of the additional information.

27. The method of claim 26 wherein the portion of the additional information includes a username associated with the telephone.

28. A method of activating a digital telephone comprising:
creating logical profile for said digital telephone in a configuration file, the configuration file being accessible over a computer network;
associating a SIP-enabled switch and a telephone extension to the logical profile;
assigning a configuration code, a gateway server, an internet protocol address associated with the gateway server, and at least one permission to the logical profile;
connecting the digital telephone to the computer network;
providing the configuration code to the digital telephone;
transmitting, from the digital telephone, the MAC address associated with the digital telephone, wherein the transmitting the MAC address would not be possible but for the providing the configuration code to the digital telephone; and,
adding the MAC address to the logical profile.

29. The method of claim 28 wherein a barrier impeding the digital telephone from communicating with an other device is reduced by the adding step, wherein the barrier existed prior to the adding step.

30. The method of claim 29 wherein the barrier relates to the logical profile not being sufficiently identifiable prior to the adding step.

31. The method of claim 30 wherein the barrier relates to the digital telephone not being able to identify the logical profile prior to the adding step.

32. The method of claim 28 wherein a network component was unable to assist the digital telephone communicating with an other device prior to the adding step;
wherein the digital telephone needs the assistance of the network component to communicate with the other device;
wherein only after the adding step is the network component able to assist the digital telephone in communicating with the other device.

33. The method of claim 32 wherein the network component is a queue server.

34. The method of claim 33 further including:
loading the digital telephone at a time before the transmitting of the MAC address;
reloading the digital telephone at a time after the adding step; and,
wherein only after the reloading is the digital telephone capable of employing the MAC address in the logical profile to: (a) find the logical profile and (b) send communications to and receive communications from an other device through the assistance of the network component.

35. The method of claim 34 further including:
transmitting the configuration code;
verifying whether or not the transmitted configuration code corresponds to an information already included in the logical profile; and, when the verifying indicates that the transmitted configuration code corresponds to the information already included in the logical profile, only then performing the adding of the MAC address to the logical profile.

36. The method of claim 35 wherein the configuration code includes at least one of the following: a username, a security code, and an extension associated with the device.

37. The method of claim 36 wherein the providing of the configuration code to the device is performed by a user of the device; and, wherein the configuration code already included in the logical profile was not provided by the user of the device.

38. The method of claim 28 further including:

transmitting the configuration code;

verifying whether or not the transmitted configuration code corresponds to an information already included in the logical profile; and, when the verifying indicates that the transmitted configuration code corresponds to the information already included in the logical profile, only then performing the adding of the MAC address to the logical profile.

39. The method of claim 38 wherein the configuration code includes at least one of the following: a username, a security code, and an extension associated with the device.

40. A method of completing a logical profile comprising:

creating the logical profile;

connecting a digital telephone to a network;

providing, via a human through an input means on the digital telephone, a configuration code;

enabling, as a result of the providing the configuration code, the device to transmit an other information;

transmitting the other information to a component on the network; and, creating a complete logical profile by adding the other information to the logical profile; and, wherein the complete logical profile enables the digital telephone to employ a MAC address associated with the digital telephone to find the complete logical profile, which the digital telephone was unable to find prior to the creating of the complete logical profile;

wherein the complete logical profile enables the digital telephone to send a communication and receive an other communication with the assistance of a queue server; and, wherein the digital telephone was unable to send the communication and receive the other communication with the assistance of the queue server prior to the creating of the complete logical profile.

41. The method of claim 40 wherein the communication is to an other device via the network and the other communication is from the other device via the network.

42. The method of claim 41 wherein the other information is the MAC address and the configuration code includes at least one of: a security code, and a user name.

43. The method of claim 42 wherein the providing of the configuration code is to the digital telephone; and, wherein the transmitting of the other information is from the digital telephone.

\* \* \* \* \*